United States Patent [19]

Secord

[11] Patent Number: 6,065,933
[45] Date of Patent: May 23, 2000

[54] FOLDING ROTOR BLADE/PROPELLER DRIVE AND PITCH CONTROL ACTUATOR

[76] Inventor: Denver D. Secord, 37284-71 Street R.R 2, S2, C2, Oliver, British Columbia, Canada, V0H 1T0

[21] Appl. No.: 09/097,394

[22] Filed: Jun. 16, 1998

[51] Int. Cl.⁷ .............................. B64C 27/50; B63H 3/00; B63H 1/06
[52] U.S. Cl. ...................... 416/142; 416/168 R; 416/159; 416/146 A; 416/163; 416/164; 416/165
[58] Field of Search ........................... 416/168 R, 146 A, 416/159, 142, 155, 163, 165, 164; 244/7 R, 35 R, 17

[56] References Cited

U.S. PATENT DOCUMENTS

| | | | |
|---|---|---|---|
| 1,496,723 | 6/1924 | Miller | 416/142 |
| 2,679,299 | 5/1954 | Kelson, Sr. | 416/164 |
| 3,142,455 | 7/1964 | Wilford | 244/7 |
| 3,356,315 | 12/1967 | Kolodziej | 244/7 |
| 3,404,852 | 10/1968 | Sambell et al. | 416/142 |
| 4,565,531 | 1/1986 | Kelson, Sr. | 416/142 |
| 5,017,090 | 5/1991 | Morrison | 416/168 |
| 5,085,315 | 2/1992 | Sambell | 244/7 |
| 5,102,301 | 4/1992 | Morrison | 416/163 |
| 5,104,291 | 4/1992 | Morrison | 416/168 |

*Primary Examiner*—Edward K. Look
*Assistant Examiner*—Richard Woo
*Attorney, Agent, or Firm*—Antony C. Edwards

[57] ABSTRACT

A propulsion blade retraction and pitch control apparatus includes a hollow primary drive shaft, a pitch control gear assembly mounted, within a propeller hub, to the primary drive shaft, a radially spaced array of pitch control stub shafts mounted to, in co-operation with, the pitch control gear assembly, so as to be selectively rotatable about corresponding pitch control shaft longitudinal axes upon selective actuation of the pitch control gear assembly, propulsion blades pivotally mounted to the pitch control stub shafts at ends of the pitch control stub shafts radially distal from the pitch control gear assembly, one or two coaxial nested pitch control drive shafts, rotatably co-axially journalled so as to be nested within, and co-axial to, the hollow primary drive shaft, said pitch control drive shaft or shafts selectively rotatable to actuate the pitch control gear assembly.

60 Claims, 9 Drawing Sheets

FOLDING ROTOR BLADE/PROPELLER DRIVE AND PITCH CONTROL ACTUATOR

FIELD OF THE INVENTION

This invention relates to the field of mechanisms for folding rotor blades, propellers or the like, and in particular relates to a novel design for actuating a folding mechanism without adversely interfering with pitch control.

BACKGROUND OF THE INVENTION

It is known that propeller driven watercraft or aircraft, rotor aircraft, and jet propelled watercraft or aircraft each have their associated performance strengths and weaknesses. For example, propeller driven aircraft are useful when slow loitering flight is desired, for example, when it is desired both to observe the ground below, and when flight over long range is desired. Conventional rotor aircraft, such as helicopters, are useful for shorter range flights, again where slow speed may be useful, and where vertical take-off and landing may be required. It is also now known that it is feasible to combine the useful traits of both propeller driven aircraft and rotor aircraft, for example, as displayed in the V22 Osprey™ aircraft manufactured by Boeing et al. Jet propelled aircraft are of course well adapted for high speed, extremely long range and extremely high altitude flights of which propeller driven aircraft and rotor aircraft are not capable.

Combining propellers with turbine jet engines in the case of aircraft, or with impellor water thrust motors in the case of watercraft, may take advantage of the performance of both forms of propulsion. The problem in implementation of this combination in aircraft is that propellers and rotors will, during transonic and supersonic flight, not only significantly increase drag but will present a structural hazard unless suitably stowed. Similarly, at high speeds, propellers on watercraft only add drag with no contribution to thrust. In the prior art, there has been at least one attempt to provide for folding of rotor blades in flight so as to store the blades during jet propelled flight, namely, U.S. Pat. No. 5,085,315 which issued Feb. 4, 1992 to Sambell for a Wide-range Blade Pitch Control for a Folding Rotor. The pitch control mechanism of Sambell is adapted for use in rotary wing aircraft where the mast and rotor may be pivoted between a horizontal stored position and a vertical helicopter mode position. A star gear is connected to a pitch horn so as to amplify to the rotors, control motions transmitted to the pitch horns through a push-pull control tube parallel to either the folding axis of the rotor blade or the mast axis.

Applicant is also aware of U.S. Pat. No. 5,102,301 which issued Apr. 7, 1992, to Morrison for Variable Pitch Propeller Blades, Hub and Drive and Adjusting Mechanism Therefor. Morrison discloses propellers used in stern drive propulsion for boats where the propellers are of variable pitch, the pitch adjusted by a pitch adjusting mechanism. In one embodiment, propeller blades are mounted on a hollow drive shaft connected to the second rotatable drive shaft by means of a set of matching bevelled gears. The propellers are turned so as to propel the boat by rotation of the shafts by an outboard motor or inboard motored power train. A pitch adjusting shaft may be moved linearly within the hollow drive shaft to thereby cause the pitch of the blades to be changed. The pitch adjusting shaft is slid linearly within the hollow drive shaft by a pitch control rod driving an L-shaped pivot. Linearly driving the pitch control shaft relative to the hollow drive shaft rotates the propeller blades about stub axles by means of mechanical linkages on the end of the pitch adjusting shaft rotate lever arms or lobes also rotatably mounted on the stub axles and rigidly mounted to the blades.

Applicant is also aware of U.S. Pat. No. 3,142,455 which issued Jul. 28, 1964 to Wilford for a Rotary Vertical Take-off and Landing Aircraft. Within the rotor blade head of Wilford, is disclosed an outer gimbal member freely and rotatably mounted on a universally mounted inner swash plate member. A number of cyclic pitch control arms or linkages are universally connected to the swash plate member, spaced 90 degrees apart from each other. The other gimbal member is operatively coupled to each of the rotor blades by a pitch control link universally connected to the outer gimbal member and pivotally connected to each shank of the blades by means of a link which in turn is pivotally connected to a pitch control arm rigid with an extending forwardly of the blade and lying within its chordal plane. Each of the rotor blade pitch control links at one end is universally connected to the outer gimbal member and blade pitch lever at a point forwardly of the leading edge and direction of rotation of the related rotor blade. The angle of attack of the rotor blades may thereby be adjusted. The rotor blades may be controlled throughout a folding operation between a coning or trailing arrange and an extended propulsive position by means of the swash plate assembly which provides the cyclic and collective pitch control of the blades.

SUMMARY OF THE INVENTION

In summary, the propulsion blade deploying and pitch control apparatus of the present invention for an airborne or water-borne craft includes:

(a) a hollow primary drive shaft having first and second ends, (b) a pitch control gear housing mounted to the first end of primary drive shaft, (c) a radially spaced array of pitch control stub shafts mounted to, in cooperation with, the pitch control gear housing, so as to extend generally perpendicularly relative to the primary drive shaft, and so as to be selectively rotatable about corresponding pitch control shaft longitudinal axes upon selective actuation of gears mounted in the pitch control gear housing, (d) propulsion blades pivotally mounted to the pitch control stub shafts at ends of the pitch control stub shafts radially distal from the pitch control gear housing, (e) primary drive means mounted to the primary drive shaft for rotation of the primary drive shaft, the pitch control gear housing, the pitch control stub shafts and the propulsion blades about a primary drive shaft longitudinal axis, (f) a selectively actuable strut mount plate rigidly mounted on a collar, the collar slidably mounted on the primary drive shaft, the strut mount plate rotatably mounted on a first supporting base, the strut mount plate, the collar and the first supporting base selectively translatable by means of first selective actuation means so as to slide along the primary drive shaft by means of the collar sliding on the primary drive shaft, the first selective actuation means rigidly mounted to the craft, the collar having a key-way, parallel and cooperating with the primary drive shaft for preventing relative rotational movement between the collar and the primary drive shaft about the primary drive shaft longitudinal axis, (g) strut members having first and second ends, the strut members pivotally mounted at the first ends thereof to the propulsion blades, and pivotally mounted at the second ends thereof, to the strut mount plate, whereby selective translation of the strut mount plate along the primary drive shaft selectively pivots the propulsion blades relative to the pitch control stub shafts, (h) at least one, and advantageously two, coaxial nested pitch control drive shafts, each having corresponding first and second ends, and rotatably coaxially journalled so as to be nested within, and co-axial to, the hollow primary drive shaft, said pitch control drive shafts selectively rotatable relative to each other and to the primary drive shaft, the first ends of the pitch control drive shafts engaging the gears in the pitch control gear housing, (i) a second collar having one inclined or helical slot or groove on an inner cylindrical surface thereof for each pitch control drive shaft, the second collar slidably mounted on the second end or ends of the corresponding pitch control drive shafts, rigid protrusions corresponding to the inclined or helical slots or grooves, where the rigid protrusions may be keys, pins, helical spline or flanges or the like, mounted, if more than one, longitudinally spaced apart from each other, to the second ends of the corresponding pitch control drive shafts so as to protrude therefrom for sliding mating engagement with the corresponding inclined or helical slot or groove in the second collar, each inclined or helical slot or groove defining an inclined translation path inclined relative to the primary drive shaft longitudinal axis, wherein, said translation paths are oriented counter to one another so that, upon translation of the second collar, the coaxial pitch control drive shafts counter-rotate relative to each other, (j) second selective actuation means for selectively sliding the second collar axially along the second ends of the pitch control drive shafts, the selective sliding of the second collar forcing rotation about the primary drive shaft longitudinal axis of the corresponding rigid protrusion so as to translate the corresponding rigid protrusion along the corresponding translation path thereby rotating the corresponding pitch control drive shaft relative to the primary drive shaft, whereby pitch of the propulsion blades may be selectively adjusted while the propulsion blades are rotating about the primary drive shaft longitudinal axis, the second selective actuation means rigidly mounted to the craft, (k) the second collar having a second key-way, parallel and cooperating with the pitch control drive shafts for preventing relative rotational movement between the second collar and the pitch control drive shafts about the primary drive shaft longitudinal axis, Advantageously the first selective actuation means includes a first screw spindle threadably mounted in a rigid support, and the first screw spindle is rotatably mounted to the first supporting base, whereby rotation of the first screw spindle selectively translates the first collar along the primary drive shaft longitudinal axis relative to the primary drive shaft.

Further advantageously, the second collars are coupled to the primary drive shaft by guides, wherein the guides are slidably mounted between the primary drive shaft and the collars, so as to extend therebetween parallel to the primary drive shaft longitudinal axis, so as to allow sliding translation of the second collars along the second ends of the corresponding pitch control shafts relative to the primary drive shaft, the guides rotating the second collars synchronously with the primary drive shaft about the primary drive shaft longitudinal axis.

In one aspect of the invention the second collars are each rotatably mounted on corresponding second supporting bases lying in a plane perpendicular to the primary drive shaft longitudinal axis, and wherein the second supporting bases are mounted to the corresponding second selective actuation means.

In a second aspect, each second selective actuation means includes a second screw spindle threadably mounted in a rigid support, the second screw spindle rotatably mounted to the corresponding second supporting base, whereby selective rotation of a second screw spindle selectively translates the corresponding second collar along the primary drive shaft longitudinal axis relative to the primary drive shaft.

In one embodiment of the invention the radially spaced array of pitch control stub shafts are two or more equally spaced apart pitch control stub axles, each having a corresponding pitch control gear within the pitch control gear housing so as to form opposed facing pitch control gears, pairs of opposed facing pitch control gears when there are an even number of pitch control stub axles. The first and second pitch control drive shaft gears are mounted to their respective coaxial pitch control drive shaft in opposed facing relation within the pitch control gear housing generally perpendicular to the pitch control gears. If there is only one pitch control drive shaft, then it may be mounted to either pitch control drive shaft gear, but not to both because of the necessary counter-rotation of the pitch control drive shaft gears relative to each other. The first pitch control drive shaft gear is in mating engagement with all of the opposed facing pitch control gears at generally co-planar first points of contact. The second pitch control drive shaft gear is in mating engagement with all of opposed facing pitch control gears at generally co-planar second points of contact. The coaxial alignment of the nested pitch control drive shafts permit the first and second pitch control drive shafts to be counter-rotated relative to each other, thereby enabling rotation of the pitch control gears without clashing or otherwise inadequate torque which would prevent adjusting the pitch of the blades. The first points of contact are opposite to the second points of contact relative to the opposed facing pitch control gears.

Opposed facing pitch control gears have first teeth formed over generally an upper quadrant and second teeth formed over generally a lower quadrant. The intervening diametrically opposed quadrants of each pitch control gear are toothless, that is, smooth. The first and second pitch control drive gears are in continual meshing engagement with the upper and lower quadrants of each pitch control stub axle gear respectively.

In a third aspect of the present invention, the strut mount plate extends generally orthogonally to, and so as to be axially symmetric about, the primary drive shaft longitudinal axis, and the first and second collars are axially symmetric about the primary drive shaft longitudinal axis.

Advantageously the propulsion blades are rotor blades, or propeller blades such as aircraft propeller blades or watercraft propeller blades, or the propulsion blades are watercraft jet drive impeller blades.

In a fourth aspect the strut members are pivotally mounted to the propulsion blades by lever arms to extend generally orthogonally to a plane containing the pitch control stub shaft longitudinal axes, and the strut members have first and second opposite ends, the first ends pivotally mounted to the propulsion blades, the second ends pivotally mounted to the strut mount plate. In a further aspect, the lever arms are rotatably mounted on the propulsion blades so as to allow the propulsion blades to rotate about their longitudinal axes so as to change blade pitch. Advantageously, the lever arms are rotatably mounted on the propulsion blades at radially inner-ends of the propulsion blades by collars rigidly mounted to the lever arms and rotatably mounted around base ends of the propulsion blades.

In a fifth aspect, the radially spaced array of pitch control stub shafts are an uneven number of at least 3 equally spaced apart pitch control stub axles, each having corresponding pitch control gears within the pitch control housing, a pitch control drive shaft gear mounted to the pitch control drive shaft generally perpendicular to the pitch control gears, the pitch control drive shaft gear in mating engagement with the pitch control gears, rotation of the pitch control drive shaft thereby rotating the pitch control stub shafts.

Further advantageously, the second collar is rotatably retained within a radially centroidal aperture in the second supporting base by a second thrust collar mounted onto an end of the second collar protruding through the radially centroidal aperture. The second collar may further comprises an annular plate rigidly mounted to the second collar so as to extend generally orthogonally radially outwardly of the second collar. The second thrust collar may be mounted on the second collar on a side of the second supporting base opposite to the annular plate mounted to the second collar, wherein the annular plate mounted to the second collar is rotatably supported on the second supporting base. The second supporting base may be an annular base plate corresponding in shape to the annular plate mounted to the second collar. The second thrust collar may be selectively adjustably mounted onto the second collar for selectively adjusting compression of the second supporting base between the second thrust collar and the annular plate mounted to the second collar.

In a further aspect, the first collar is rotatably retained within a first radially centroidal aperture in the first supporting base by a first thrust collar mounted onto an end of the first collar protruding through the first radially centroidal aperture. The first thrust collar may be mounted on the first collar on a side of the first supporting base opposite to the strut mount plate. The first supporting base is an annular plate corresponding in shape to the strut mount plate. The first thrust collar may be selectively adjustably mounted onto the first collar for selectively adjusting compression of the first supporting base between the first thrust collar and the strut mount plate.

In yet a further aspect of the present invention, the pitch control drive shaft has extending longitudinally therealong an oil infeed bore and, spaced apart from the oil infeed bore, an oil return bore. An oil infeed collar is rotatably mounted onto the pitch control drive shaft and has a first radial collar aperture therethrough for fluid communication of lubricating oil from an oil supply line mounted to the oil infeed collar to a corresponding infeed radial shaft aperture radially bored from an outer surface of the pitch control drive shaft to intersect the oil infeed bore so that as the pitch control drive shaft is rotated about its longitudinal axis, a radially outermost-end of the radial infeed shaft aperture is rotated in a circular path so as to expose the radially outermost-end of the first radial shaft aperture within a sealed annular oil reservoir cavity between an inner annular surface of the oil infeed collar and the pitch control drive shaft. Oil fed under pressure from the oil supply line is thereby fed into the oil reservoir cavity and thence to the oil infeed bore. The oil infeed bore has at least one outfeed radial shaft aperture spaced apart from the infeed radial shaft aperture and located along the oil infeed bore at positions requiring lubrication. The outfeed redial shaft aperture cooperates with the oil infeed bore for supplying oil to the positions requiring lubrication. The pitch control drive shaft has outfeed radial shaft apertures correspondingly located to the position requiring lubrication, along, so as to cooperate with, the oil return bore to thereby transfer oil from the positions requiring lubrication along the oil return bore.

The pitch control drive shaft has an outfeed radial shaft aperture in fluid communication between the oil return bore and an oil return aperture in an oil return collar rotatably mounted on the pitch control drive shaft. An oil return line is mounted to the oil collar for removing oil from the oil return collar. The positions requiring lubrication include, for example, the pitch control gear housing and positions corresponding to the first and second collars.

DETAILED DESRIPTION OF THE PREFERRED EMBODIMENT

As seen in FIGS. 1–5, blades 12, which it is understood collectively refers to rotor blades, propellers or like cantilevered fluid propulsion members or aerodynamic lifting foils, are pivotly mounted to a supporting frame, such as airframe 10 by means of clamping arms 14 to hub 16 at pins 18. It is understood that reference to an airframe is by way of example only and is not intended to be limiting. A person skilled in the art would understand that the mechanism of the present invention is equally adaptable to other land or water borne vehicles.

Figure 1:
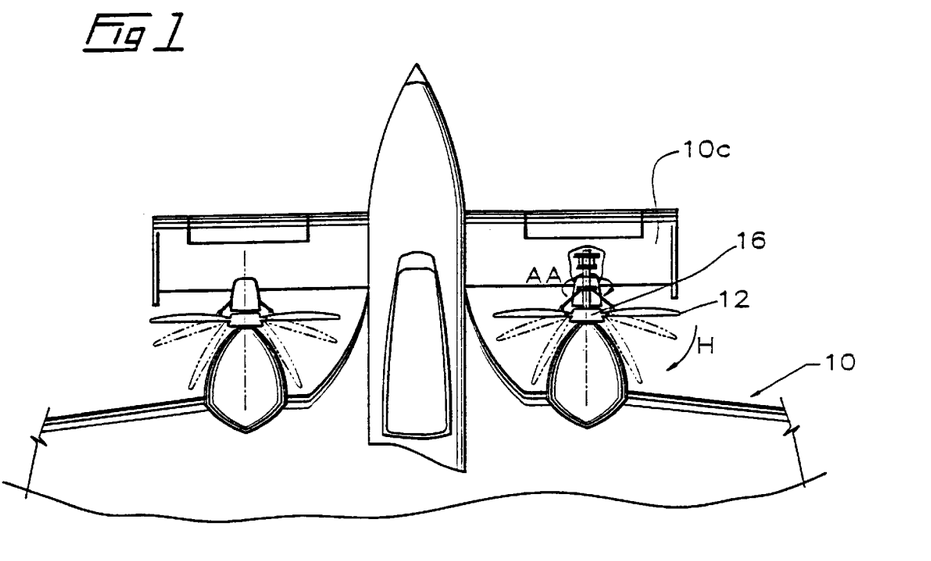
FIG. 1 is a partially cut away plan view, illustrating the folding blade drive and pitch control actuator of the present invention installed on an aircraft.
Figure 2:
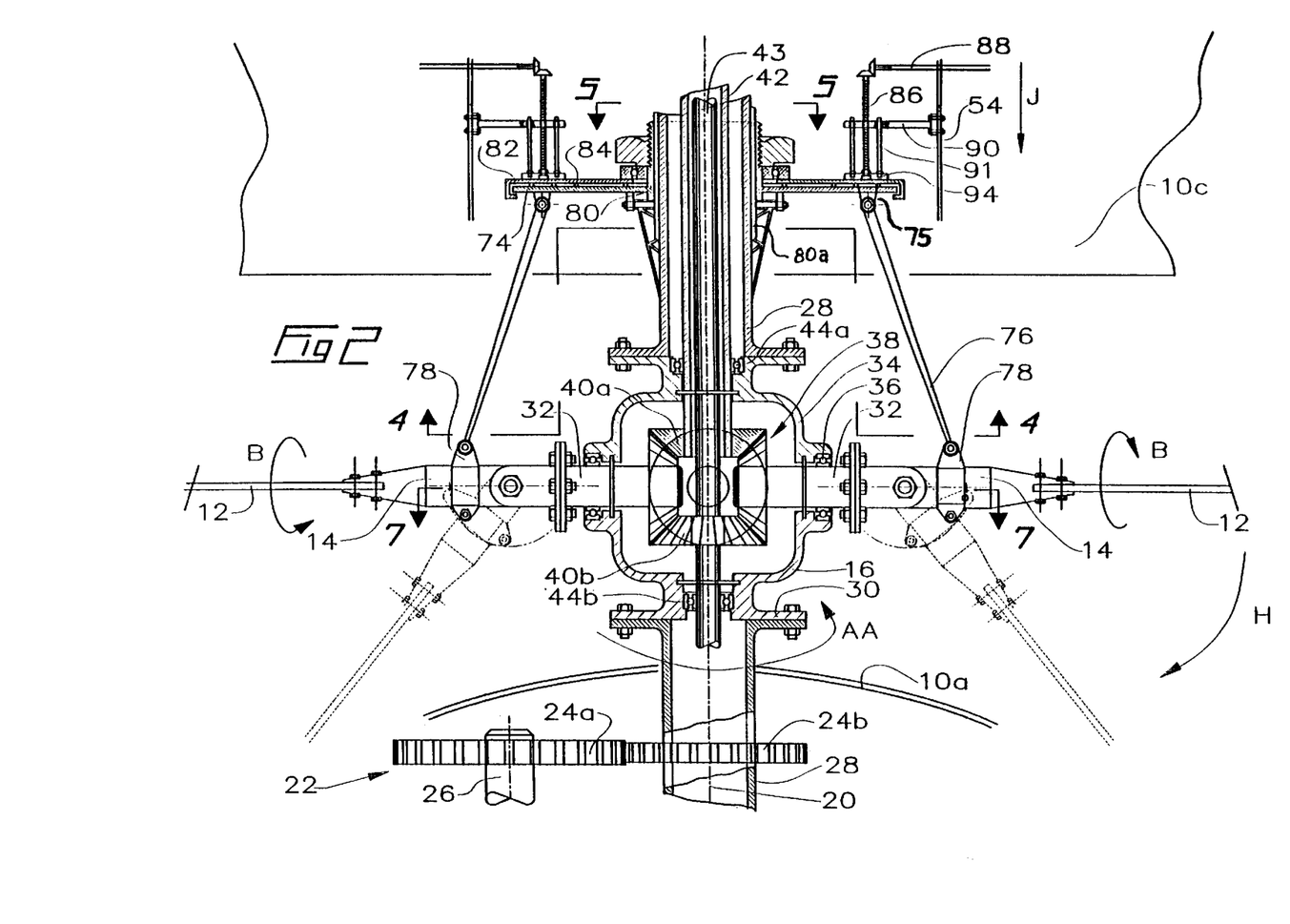
FIG. 2 is a detailed sectional view, illustrating one embodiment of the folding blade drive and pitch control actuator of the present invention.
Figure 3:
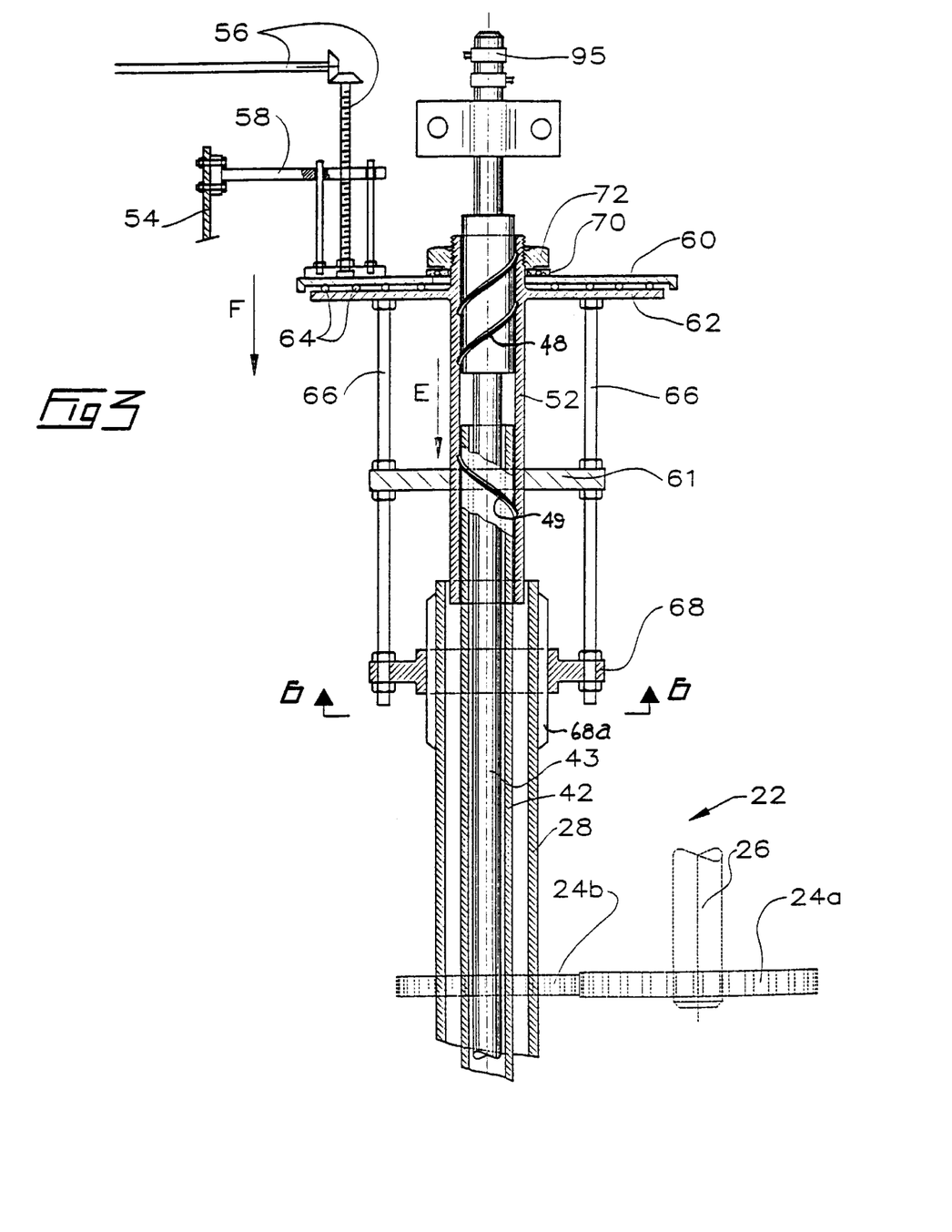
FIG. 3 is a detailed sectional view, illustrating one embodiment of the pitch control actuator of the present invention.
Figures 4, 5, 6:
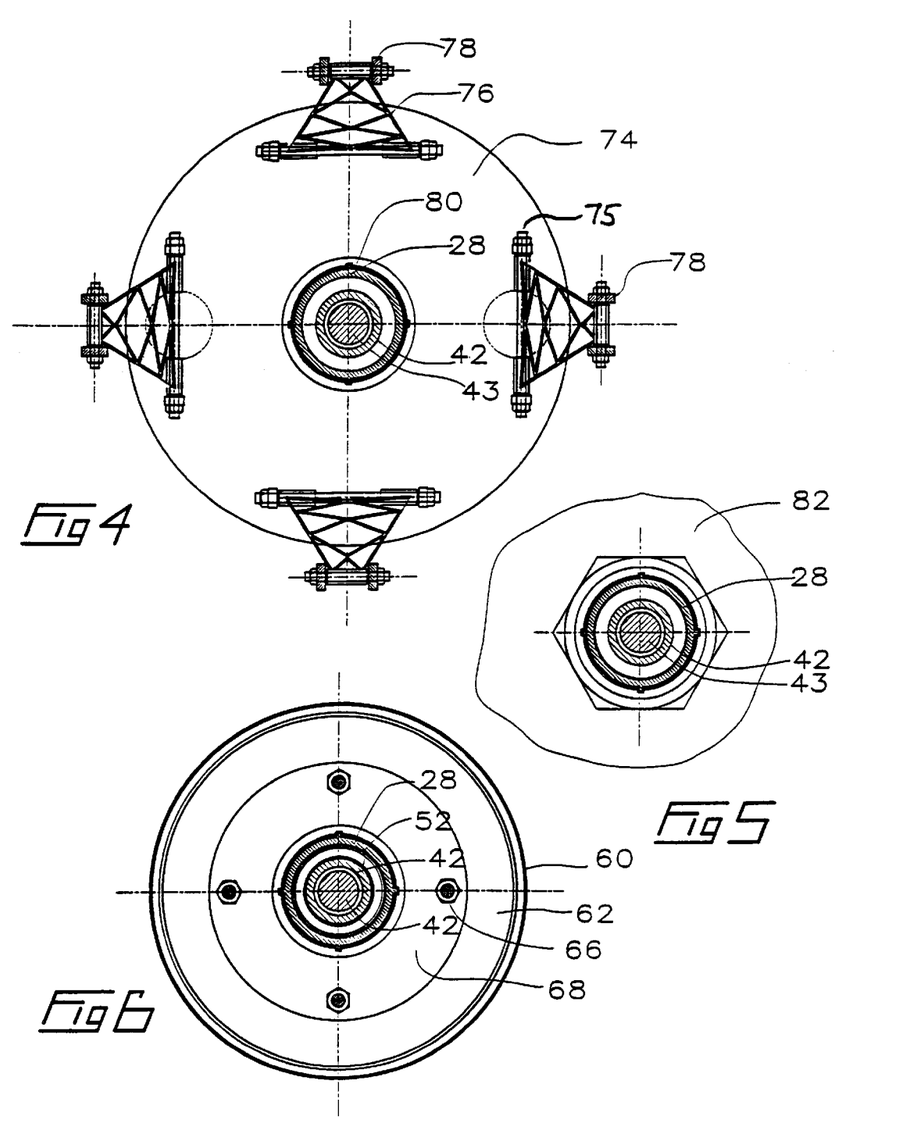
FIG. 4 is a sectional view along line 4—4 in FIG. 2.
FIG. 5 is a sectional view along line 5—5 in FIG. 2.
FIG. 6 is a sectional view along line 6—6 in FIG. 3.

As seen in FIGS. 1, 2 and 3, blades 12 are deployed when in use. In respect of FIGS. 1 and 2, once the aircraft has taken off and has reached level flight, blades 12 may be retracted to remove them from the line of flight so that the aircraft may be powered primarily by jets (not shown). Blades 12 may assist in vertical take-off and landing, such as in the V22 Osprey™ aircraft, or may assist more conventional runway take-off or slow loitering flight. During retraction, blades 12 are drawn in direction H toward their axis of rotation 20. The blades continue to retract until they have drawn adjacent to the sides of conical section cowling or fairing 10a. The blades are preferably retracted by a powered retraction mechanism or apparatus such as seen in FIG. 2 so that the rate of the retraction can be controlled by the operator.

Once horizontal flight has been achieved, blades 12 may be used in conjunction with the jets (not shown) to accelerate the aircraft. At some point the forward velocity of the aircraft will become so great due to the additional acceleration provided by the jet engines, that the blades are no longer able to provide any contribution to the forward propulsion of the aircraft, and will become solely a source of drag. Further, as the forward velocity of the aircraft becomes very high, the stresses on the blades will increase to the point where the blades may be damaged by keeping them in the airstream during forward motion of the aircraft. It is preferably at the point where the blades begin to no longer provide an additional benefit in thrust that they are retracted. Thereafter, forward level conventional flight is achieved by virtue of the jet engines only.

Figure 13:
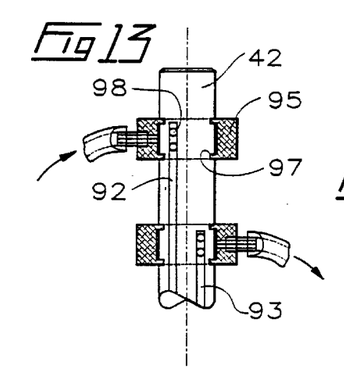
FIG. 13 illustrates an apparatus for supplying lubricating oil to the pitch control mechanism.
Figure 14:
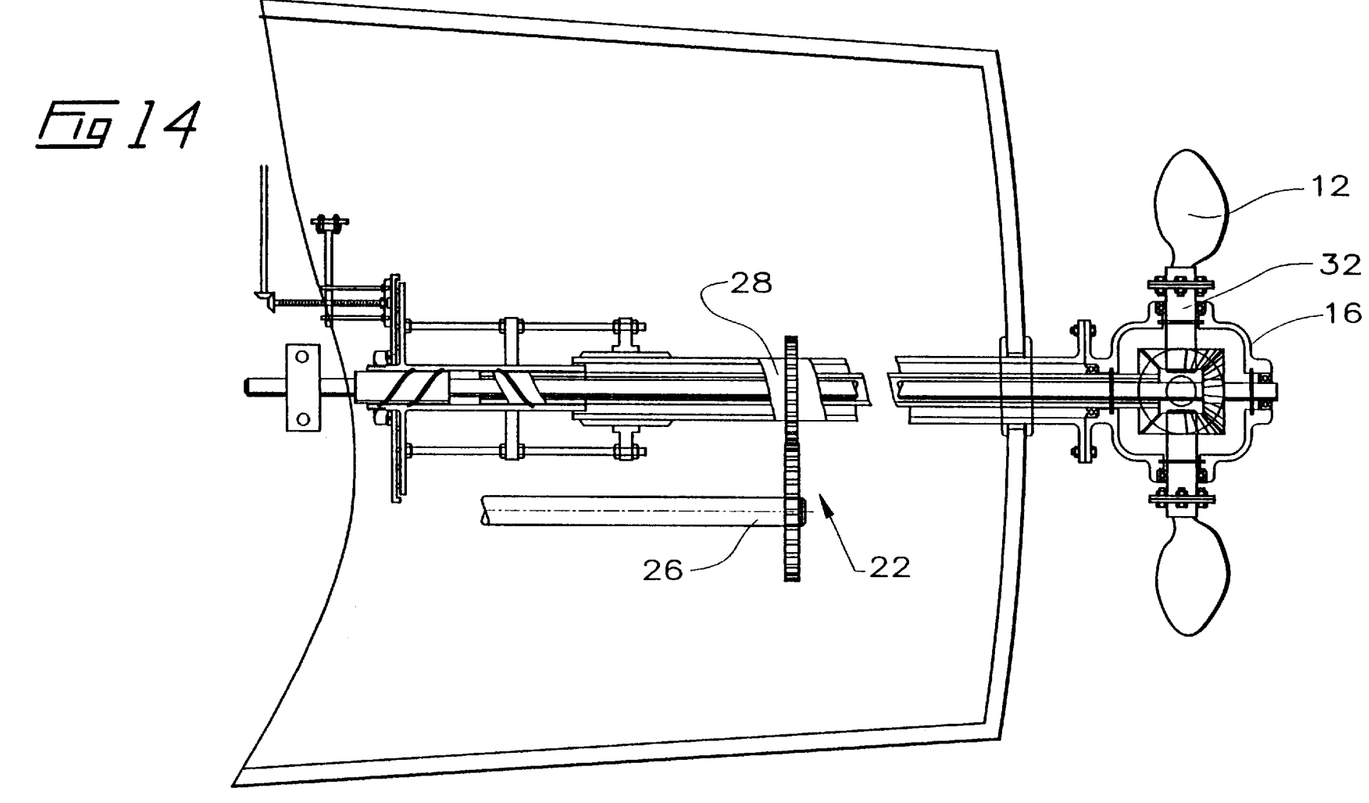
FIG. 14 is a horizontal sectional view of the pitch control actuator of the present invention installed into the hull of a watercraft.

When lift or forward thrust is desired from blades 12, hub 16 is rotated in direction AA about drive shaft longitudinal axis 20 by means of drive coupling 22, which may as illustrated in FIG. 2 for sake of example only be meshing drive gears 24a and 24b, driven by auxiliary drive shaft 26, wherein drive gear 24a is rigidly mounted to auxiliary drive shaft 26, and drive gear 24b is rigidly mounted to rotor drive shaft 28. Drive shaft 28 may be bolted or otherwise rigidly mounted, at its uppermost end, to an annular lower mating member 30 on hub 16. Alternatively it will be noted that the drive mechanism may be optionally mounted as illustrated by broken lines in FIG. 3. This mounting configuration will be deemed advantageous in marine applications such as illustrated in FIGS. 13 and 14.

Figures 7, 8, 8A, 9:
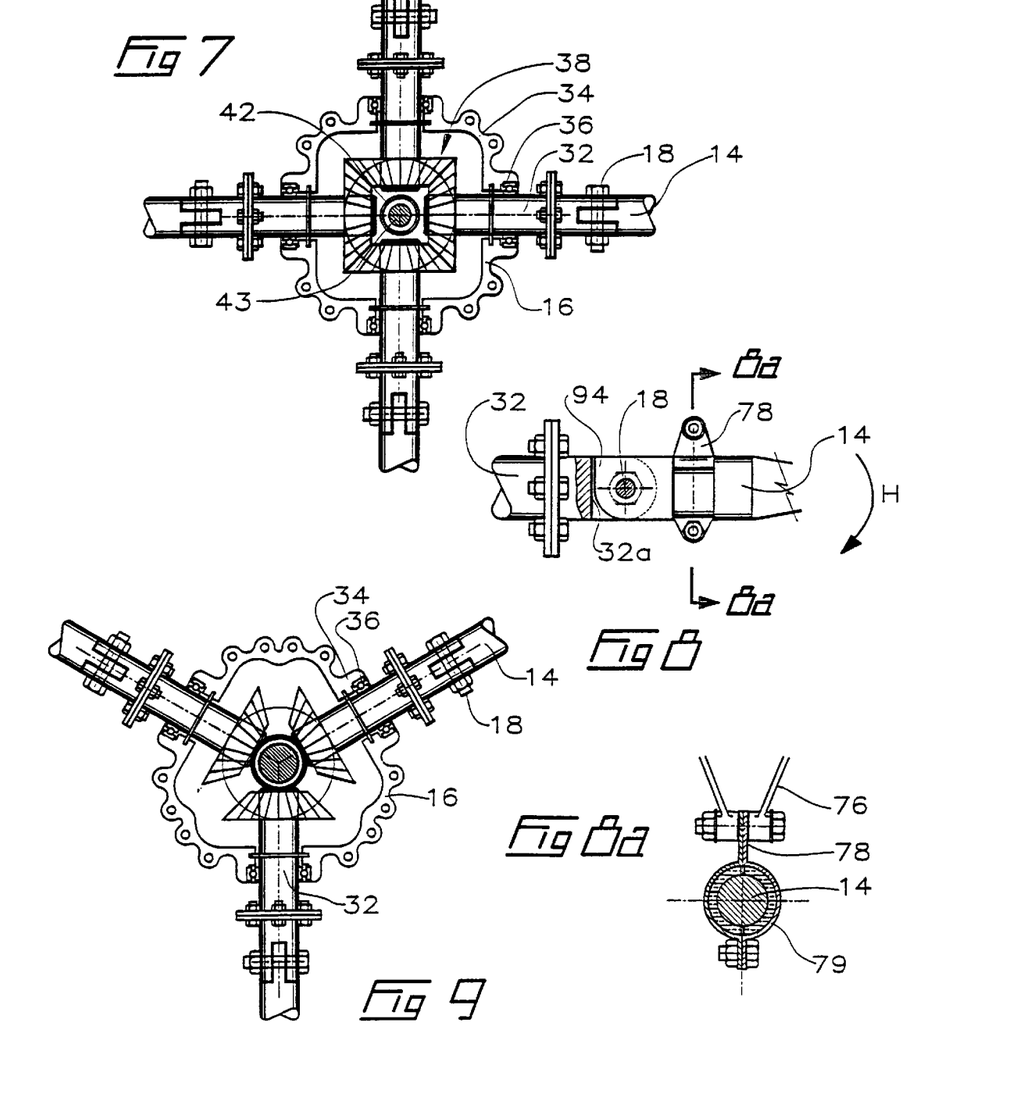
FIG. 7 is a horizontal sectional view through the pitch control gear housing illustrated in FIG. 2.
FIG. 8 is an enlarged cut-away view, illustrating the hinge mechanism coupling a blade to a pitch control shaft.
FIG. 8a is a sectional view along line 8a—8a in FIG. 8.
FIG. 9 is a partially cut-away plan view, the pitch control actuator hub of a three blade embodiment.
Figure 10:
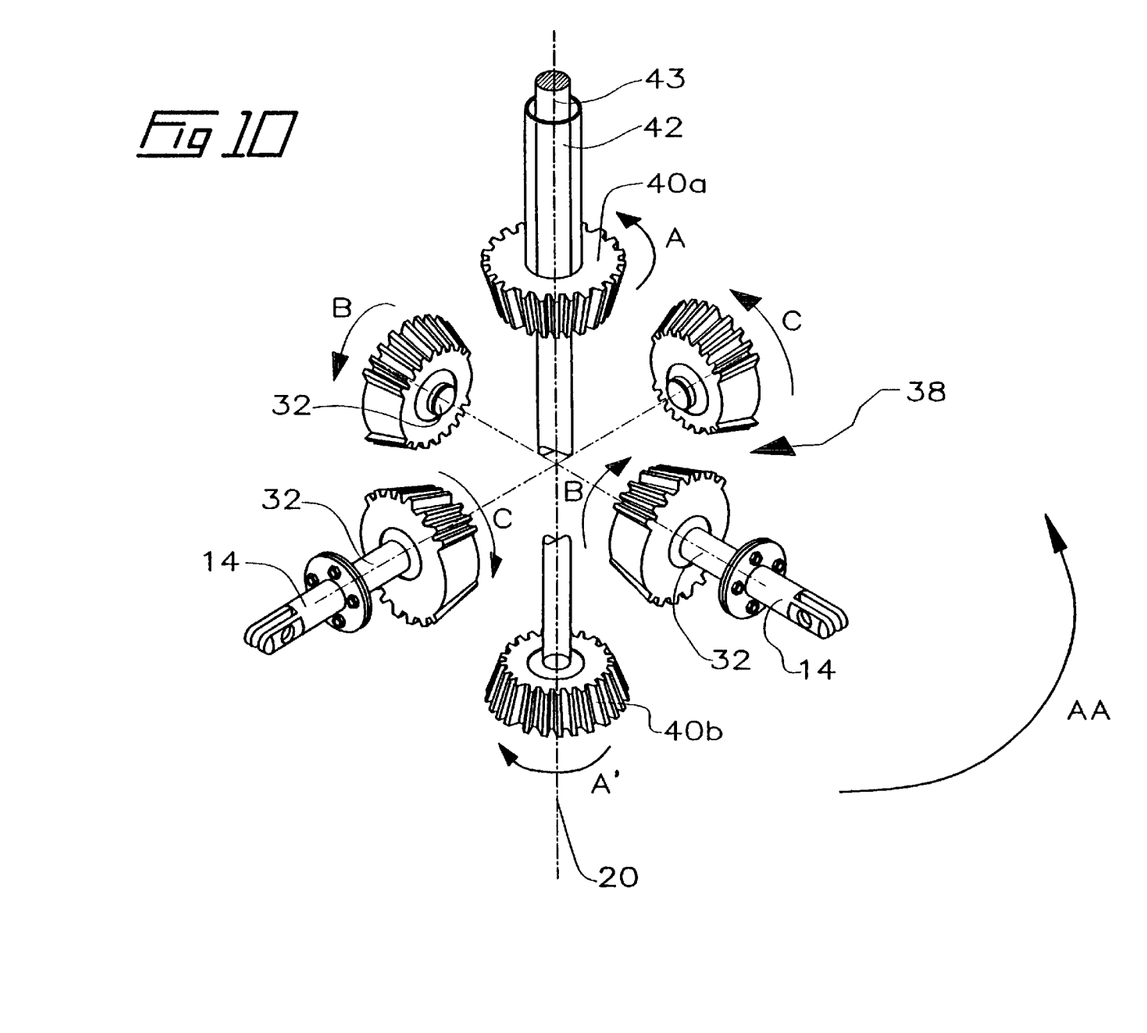
FIG. 10 is, in exploded view, the pitch control hub of FIG. 2 and 7 with the hub housing removed for clarity.
Figure 15:
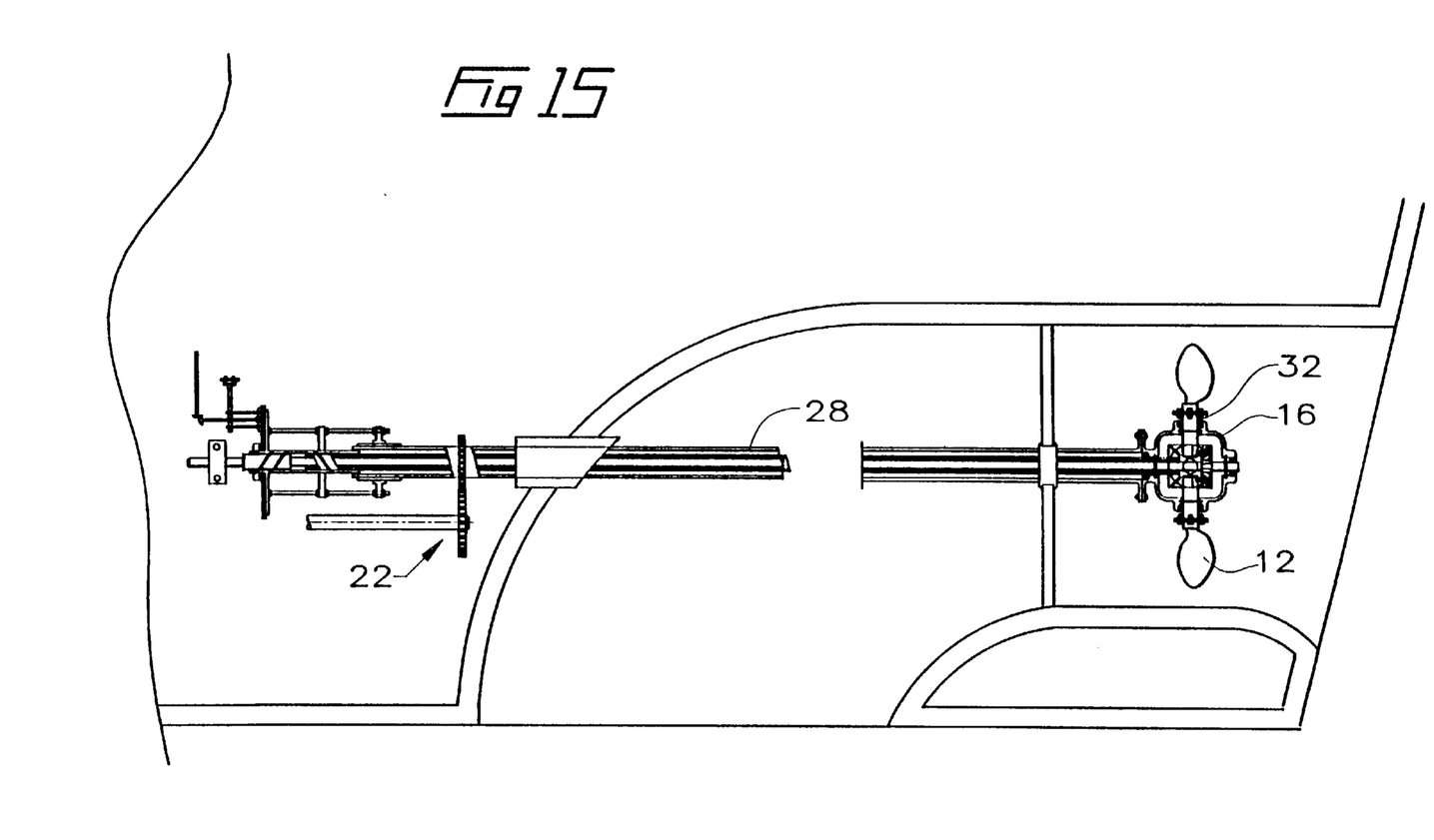
FIG. 15 is a vertical sectional view of the pitch control actuator of the present invention installed into the hull of a jet powered watercraft.

Pitch control drive axles 32 are rotatably mounted through the sidewall 34 of hub 16 in radially spaced apart array, equally spaced apart around, and perpendicular to, drive shaft longitudinal axis 20. Two or more pitch control drive axles 32 may protrude from hub 16. FIGS. 2, 7 and 10 illustrate an embodiment consisting of four pitch control drive axles 32. FIG. 9 illustrates an embodiment consisting of three pitch control drive axles 32. FIGS. 14 and 15 illustrate an embodiment consisting of two pitch control drive shafts 32. Propellers having five or more blades may also be employed within the scope of the present invention.

Pitch control drive axles 32 are rotatably snugly journalled within bearings 36, which may be roller bearings or the like known in the art, mounted within sidewall 34. Rotor pitch control gears 38, better seen in FIGS. 2, 7 and 10, are rigidly mounted on the ends of the pitch control drive axles 32 protruding into hub 16. Fore and aft pitch control gears 40a and 40b, rigidly mounted, respectively, to the innermost ends of their respective coaxial pitch control drive shafts 42 and 43, are mounted into mating adjacency with pitch control drive gears 40a and 40b, subject to the further explanation below of the modified tooth arrangement on pitch control gears 40a and 40b. Coaxial pitch control drive shafts 42 and 43 are coaxial along, and with, drive shaft longitudinal axis 20. Pitch control drive gears 40a and 40b are mounted journalled through corresponding bearings 44a and 44b in the upper and lower, or fore and aft, ends of hub 16 so as to be mounted perpendicular to the plane containing the plane of rotation of pitch control drive axles 32 as they rotate on hub 16 about drive shaft longitudinal axis 20.

Since the pitch control drive force is applied to rotate blades 12 through pitch control drive shafts 42 and 43, only portions of the rotor pitch control gears 38 is in continual meshing engagement with the upper and lower pitch control drive gears 40a and 40b. During operation of the pitch control mechanism to the aircraft propellers it is expected that a maximum pitch change from a neutral position would not normally exceed 40 degrees, or advantageously 30 degrees on either side of the neutral position. Consequently with reference to FIG. 10 it will be clearly noted that only the upper and lower diametrically opposite quadrants of pitch control gears are toothed while the remaining gear quadrants are smooth. The smooth portions prevent the possibility of gear lock-up by tooth contact of the adjacent counter rotating pitch control gear.

Rotation of pitch control drive shaft 42 in direction A results in the respective rotation in direction B and C of pitch control drive shafts 32. Rotation of pitch control drive shaft 43 in a direction counter to direction A, that is direction A', rotates pitch control axles 32 in the same rotational direction, that is direction B and C as seen in FIG. 10.

By referring to FIG. 10 it will be understood that coaxial pitch control drive shafts 42 and 43 allow the respective pitch control drive gears 40a and 40b to be simultaneously rotated in opposite directions thereby permitting said drive gears 40a and 40b to be in continual meshing engagement with all of the pitch control gears 38. This arrangement permits greater operational torque to be applied to the pitch control mechanism and provides an increased level of safety. That is, there is reduced probability of as simultaneous failure of both pitch control drive shafts under normal use.

It is understood that pitch control drive shafts 42 and 43 are capable of being rotated in either direction, that is clockwise as well as anti-clockwise, depending on the requirements of the operator and aircraft. During aircraft take-off, propeller pitch would be set to provide maximum thrust while during aircraft landing, once the aircraft is on the ground, propeller pitch mass be feathered or reversed during deceleration of the aircraft.

Two and three blade propellers could also have a different gear ratio because the mover gears can be smaller than the ones that move the propeller blades. That would be a reduction gear but if you use a 4 blade arrangement all gears have to be of equal size, and if you build a 5 blade the mover gears have to be larger than the 5 gear arrangement which in turn would increase the ratio.

The embodiment for installation into an aircraft, such as seen in FIG. 1, where blades 12 are mounted between the wings 10b and canard 10c would require that the drive shaft 26 run from a power plant in the aircraft fuselage or wings. Alternatively, power may be derived from turbine engines aft of blades 12. The drive shaft may also be driven from a canard mounted structure whether or not the power plant is in the canard or forward fuselage, or aft as seen in FIG. 1 and mechanically linked through the canard, so long as blades 12 may be folded in direction H. It is understood that the power plants may also include hydraulic or electric drive motors.

Figure 11:
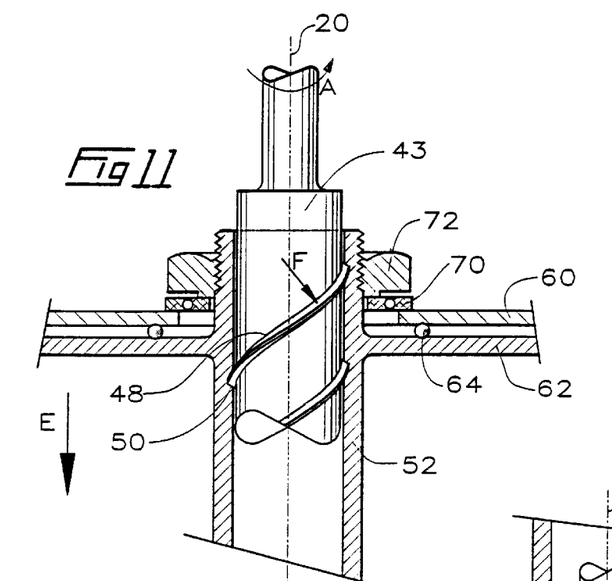
FIG. 11 is an enlargement of a portion of the pitch control device illustrated in FIG. 3.
Figure 12:
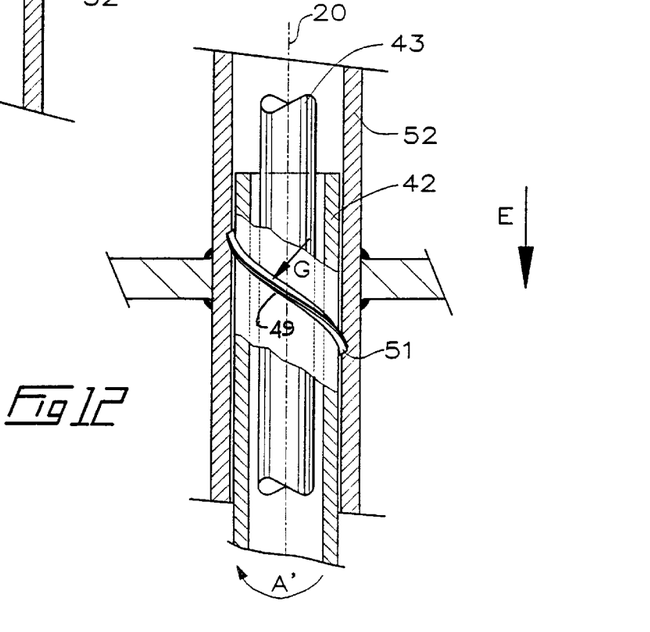
FIG. 12 also is an enlargement of a portion of the pitch control device illustrated in FIG. 3.

As seen in FIGS. 3, 11 and 12, the rotation of pitch control drive shafts 42 and 43 within hollow rotor drive shaft 28 is controlled by the rotational movement of helical ridges 48 and 49, respectively, formed near an end of each of the pitch control drive shafts. The helical ridges are oriented about the circumference of said pitch control drive shafts in opposing rotational direction. Helical ridges 48 and 49 are slidably engaged by corresponding helical recesses or grooves 50 and 51 machined or formed into the inner face of an elongated longitudinally translatable collar 52. Ridges 48 and 49, acting in concert with said recesses 50 and 51, operate like a cam and follower when collar 52 is translated relative to pitch control drive shaft 42 and 43 along the drive shaft longitudinal axis 20.

The translation of collar 52 in direction E results in the force from contact between the helical grooves 50 and 51 in the collar 52 and the helical ridges 48 and 49 formed on the pitch control drive shafts 42 and 43 transmitting a rotational moment to pitch control drive shaft 42 in the direction of arrow F thereby rotating the drive shaft in direction A. A synchronous rotational moment is also transmitted to pitch control drive shaft 43. However, since the mating helical ridges 49 and grooves 51 are formed in the opposite rotational direction, the moment so transmitted by their contact is in the direction of arrow G, opposite to direction F, resulting in the counter-rotation of pitch control drive shaft 43 in direction A.

Rotation of pitch control drive shaft 42 in direction A and rotation of pitch control drive shaft 43 in direction A' is illustrated as movement relative to rotor drive shaft 28 and hub 16. Of course, the entire rotor or propeller assembly including blades 12, hub 16 and rotor drive shaft 28 are also rotating in direction AA, for example, in flight, when lift is required from the rotor or propeller blades, the rotation of rotor drive shaft 28 in direction AA being relative to a fixed frame of reference such as airframe 10 or housing 54.

The means for translating collar 52 in direction E, or in a direction opposite to direction E, is rigidly mounted to airframe 54. Consequently, a means must be provided for actuating translation of collar 52 without interfering with the rotation of rotor drive shaft 28. Thus, auxiliary drive spindles 56 are rotatably mounted to airframe 54, for example, by means of supporting structure 58 whereby selective rotation of auxiliary drive spindles 56 translate annular platform 60 in direction F or in the direction opposite to direction F. Plate 62 is rotatably supported on annular platform 60 by means of bearings 64 or other means known in the art. Supporting members 66 are rigidly mounted to, so as to extend between, plate 62 and annular guide flange 68 axially translatably mounted to the lowermost end of rotor drive shaft 28. An intermediate platform 61 is rigidly secured to plate 62 by way of supporting members 66 to provide axial stability as collar 52 is translated in direction F. An auxiliary guide plate 68, also secured to plate 62 by way of supporting members 66, slidably engages longitudinally aligned splines 68*a* formed around the free end of primary drive shaft 28. It will be noted with reference to FIG. 3 that the aforementioned arrangement permits only axial travel of plate 62 and collar 52 respecting the drive shaft longitudinal axis 20. Collar 52 is rigidly mounted within the center of plate 62, or it may be an integral part thereof, and extends through a center aperture in annular platform 60. Collar 52 and plate 62 are rotatably supported beneath annular platform 60 by means of bearings 70 and threaded thrust collar 72 threadably mounted onto the end of collar 52.

Blades 12 are folded in direction H by translating plate 74 in direction J, parallel to longitudinal axis 20, so as to pivot blades 12 about pins 18 by means of rigid cross braced struts or structures 76, hereinafter struts 76. Struts 76 are pivotally mounted at one end to plate 74 by means of hinged mounts 75 and pivotally mounted at their opposite end to torque or moment arms 78. Arms 78 are rigidly mounted to collars 79 which has clamping arms 14 rotatably journalled therethrough, for example by means of a split sleeve bearing as illustrated in FIG. 10*a*. Plate 74 is rigidly mounted to collar 80. Collar 80 is slidably mounted on rotor drive shaft 28. Plate 74 rotates on, and relative to, annular platform 82. Bearings 84 are provided between plate 74 and annular platform 82. This assembly is secured together by a thrust collar similar to 72 noted above which is threadably mounted onto collar 80. In operation, when blades 12 are folded, advantageously the pitch of the blades is set so as to produce lift on the blades during redeployment. Thus, when it is desired to re-deploy the blades, they are lifted aerodynamically from their folded position against the hub, rather than having to be entirely mechanically forced from their folded position by struts 76.

Again, as noted above, rotation of pitch control drive shaft 42 in direction A is illustrated as movement relative to rotor drive shaft 28 and hub 16, and, of course, the entire rotor or propeller assembly including blades 12, hub 16 and rotor drive shaft 28 are also rotating. The rotation of rotor drive shaft 28 is relative to a fixed frame of reference airframe 10 or housing 54. The means for translating collar 80 and plate 74 in direction J, or in a direction opposite to direction J is rigidly mounted to housing 54. Threaded drive spindles are provided for actuating translation of collar 80 in direction J without interfering with the rotation of rotor drive shaft 28. Thus, auxiliary threaded drive spindles 86 and 88 are rotatably mounted to airframe 54, for example, by means of supporting structure 90 whereby selective rotation of auxiliary drive spindles 86 and 88 translate annular platform 82 in direction J. Collar 80 is rigidly mounted within the center of plate 74 or may be an integral part thereof and extends through a center aperture in annular platform 82. Supporting structure 90 supports sliding non-threaded spindles 91 which assist in bracing and maintaining alignment of drive spindle 86, parallel to longitudinal axis 20, by means of crossmember 94. Drive spindle 88 is rotatably journalled through housing 54 and is free to translate relative to housing 54 in direction J' when collar 80 is translated in direction J, and vice versa in directions opposite to directions J' and J respectively. Collar 80 slidably engages longitudinally aligned splines 80*a* formed around the corresponding end of primary drive shaft 28.

FIG. 13 illustrates one method of supplying lubricating oil to the pitch control mechanism. The innermost pitch control drive shaft 42, which in this embodiment is a solid shaft has a pair of longitudinal bores 92 and 93. The bores stop short from the ends of the pitch control drive shaft such that the pitch control drive shaft remains sealed at its ends. Longitudinal supply bore 92 carries lubricating oil under pressure to a coupling 95 which is freely rotatable about the pitch control drive shaft 42 but engages recess 97 at its point of attachment to shaft 42 to prevent longitudinal movement along shaft 42. Coupling 95 encloses several holes 98 drilled radially through the pitch control drive shaft into supply bore 92. Additional holes are located along the supply bore at points requiring lubrication. An identical coupling encloses the end of oil return bore 93. As pitch control drive shaft 42 is sealed within the rotor drive shaft 28, this method affords an efficient method for lubricating the device.

An embodiment of the present invention mounted into a watercraft is illustrated in FIGS. 14 and 15. The mechanism is as described above, mounted however into a boat hull. FIG. 14 illustrates the mechanism extending through the transom of a watercraft of the type powered by an inboard motor and utilising the variable pitch components of this invention. When incorporated in watercraft utilising propellers as an auxiliary power source the propeller folding component of this invention would also be incorporated. Blades 12 are of course underwater propeller blades, foldable so as to reduce drag. This is advantageous when either the boat is to be jet propelled or when the boat is a sailboat.

As seen in FIG. 15 the propeller drive of this invention is mounted within the intake cavity of a jet drive in a boat.

As seen in FIG. 10, the rotation of blades 12 and clamping arms 14 about pins 18 in a direction opposite to direction G out of the plane of rotation of pitch control drive shafts 32, is prevented by means of stop 94 on the radially innermost ends of clamping arms 14. As clamping arms 14 rotate about pins 18 in a direction opposite to direction G, stops 94 are brought into abutment against surface 32a on pitch control drive shafts 32. Alternatively, or in combination with stops 94, a hydraulic or electro-mechanical limiter or limiting switch known in the art may be incorporated to inhibit such blade motion opposite to direction G out of the said plane of rotation of shafts 32.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A propulsion blade deploying and pitch control apparatus for an airborne or water-borne craft comprising:

a hollow primary drive shaft having first and second ends, a pitch control gear housing mounted to said first end of primary drive shaft, a radially spaced array of pitch control stub shafts mounted to, in cooperation with, said pitch control gear housing so as to extend generally perpendicularly relative to said primary drive shaft, and so as to be selectively rotatable about corresponding pitch control stub shaft longitudinal axes upon selective actuation of gears cooperatively mounted in said pitch control gear housing, propulsion blades pivotally mounted to said pitch control stub shafts, at ends of said pitch control stub shafts radially distal from said pitch control gear housing, primary drive means mounted to said primary drive shaft for rotation of said primary drive shaft, said pitch control gear housing, said pitch control stub shafts and said propulsion blades about a primary drive shaft longitudinal axis, a selectively actuable strut mount plate rigidly mounted on a first collar, said first collar slidably mounted on said primary drive shaft, said strut mount plate rotatably mounted on a first supporting base, said strut mount plate, said first collar and said first supporting base selectively translatable by a first selective actuator so as to slide along said primary drive shaft by said first collar sliding on said primary drive shaft, said first selective actuator rigidly mounted to said craft, said collar having a key-way, parallel and cooperating with said primary drive shaft for preventing relative rotational movement between said first collar and said primary drive shaft about said primary drive shaft longitudinal axis, strut members having first and second ends, said strut members pivotally mounted at said first ends thereof to said propulsion blades, and pivotally mounted at said second ends thereof, to said strut mount plate, whereby selective translation of said strut mount plate and first collar along said primary drive shaft selectively pivots said propulsion blades relative to said pitch control stub shafts so as to selectively forcibly deploy and retract said propulsion blades, a coaxial nested pitch control drive shaft, having first and second ends, and rotatably coaxially journalled so as to be nested within, and co-axial to, said hollow primary drive shaft, said pitch control drive shaft selectively rotatable relative to said primary drive shaft, said first end of the pitch control drive shaft engaging said gears in said pitch control gear housing, a second collar having an inclined slot on an inner cylindrical surface thereof, said second collar slidably mounted on said second end of said pitch control drive shaft, a rigid protrusion mounted to said second end of said pitch control drive shaft so as to protrude therefrom for mating engagement with said inclined slot in said second collar, said inclined slot defining an inclined translation path inclined relative to said primary drive shaft longitudinal axis, a second selective actuator for selectively sliding said second collar axially along said second end of said pitch control drive shaft, said selective sliding of said second collar forcing rotation about said primary drive shaft longitudinal axis of said rigid protrusion so as to translate said rigid protrusion along said translation path thereby rotating said pitch control drive shaft relative to said primary drive shaft, whereby pitch of said propulsion blades is selectively adjusted while said propulsion blades are rotating about said primary drive shaft longitudinal axis, said second collar having a second keyway, parallel and cooperating with said pitch control drive shaft for preventing relative rotational movement between said second collar and said pitch control drive shaft about said primary drive shaft longitudinal axis, said second selective actuator rigidly mounted to said craft.

2. The apparatus of claim 1 wherein said inclined slot is helical and said protrusion is a corresponding helical flange.

3. The apparatus of claim 1 wherein said first selective actuator includes a first screw spindle threadably mounted in a rigid support, said first screw spindle rotatably mounted to said first supporting base, whereby rotation of said first screw spindle selectively translates said first collar along said primary drive shaft longitudinal axis relative to said primary drive shaft.

4. The apparatus of claim 1 wherein said second collar is coupled to said primary drive shaft by a guide, wherein said guide is slidably mounted between said primary drive shaft and said first and second collars, so as to extend therebetween parallel to said primary drive shaft longitudinal axis, so as to allow sliding translation of said second collar along said second end of said pitch control shaft relative to said primary drive shaft, said guide rotating said second collars synchronously with said primary drive shaft about said primary drive shaft longitudinal axis.

5. The apparatus of claim 4 wherein said second collar is rotatably mounted on a corresponding second supporting base lying in a plane perpendicular to said primary drive shaft longitudinal axis, and wherein said second supporting base is mounted to said corresponding second selective actuator.

6. The apparatus of claim 5 wherein said second selective actuator includes a second screw spindle threadably mounted in a rigid support, said second screw spindle rotatably mounted to said corresponding second supporting base, whereby selective rotation of said second screw spindle selectively translates said second collar along said primary drive shaft longitudinal axis relative to said primary drive shaft.

7. The apparatus of claim 1 wherein said radially spaced array of pitch control stub shafts are at least four equally spaced apart pitch control stub axles, each having a corresponding pitch control gear within said pitch control housing so as to form pairs of opposed facing pitch control gears, at least one pitch control drive shaft gear mounted to said pitch control drive shaft generally perpendicular to said opposed pairs of pitch control gears, said pitch control drive shaft gear in mating engagement with said opposed pairs of pitch control shaft gears at generally co-planar first points of contact said opposed pairs of pitch control shaft gears having cooperating toothed and non-toothed quadrants so as to not clash when counter rotating, wherein rotation of said nested pitch control drive shaft counter-rotates said pitch control gears in said opposed pairs of pitch control gears without clashing.

8. The apparatus of claim 1 wherein said radially spaced array of pitch control stub shafts are two pitch control stub axles, each having a corresponding pitch control gear within said pitch control housing so as to form a pair of opposed facing pitch control gears, a pitch control drive shaft gear mounted to said pitch control drive shaft generally perpendicular to said pair of pitch control gears, said pitch control drive shaft gear in mating engagement with said pair of pitch control shaft gears at generally co-planar points of contact, wherein rotation of said nested pitch control drive shaft counter-rotates said pitch control gears in said pair of pitch control gears.

9. The device of claim 1 wherein said strut mount plate extends generally orthogonally to, and so as to be axially symmetric about, said primary drive shaft longitudinal axis, and wherein said first and second collars are axially symmetric about said primary drive shaft longitudinal axis.

10. The device of claim 1 wherein said propulsion blades are rotor blades.

11. The device of claim 1 wherein said propulsion blades are propeller blades.

12. The device of claim 11 wherein said propeller blades are aircraft propeller blades.

13. The device of claim 11 wherein said propeller blades are water-craft propeller blades.

14. The device of claim 1 wherein said propulsion blades are water-craft jet drive impeller blades.

15. The device of claim 1 wherein said strut members are pivotally mounted to said propulsion blades by lever arms to extend generally orthogonally to a plane containing said pitch control stub shaft longitudinal axes.

16. The device of claim 15 wherein said strut members have first and second opposite ends, said first ends pivotally mounted to said propulsion blades, said second ends pivotally mounted to said strut mount plate.

17. The device of claim 16 wherein said lever arms are rotatably mounted on said propulsion blades so as to allow said propulsion blades to rotate about their longitudinal axes so as to change blade pitch.

18. The device of claim 17 wherein said lever arms are rotatably mounted on said propulsion blades at radially inner-ends of said propulsion blades by collars rigidly mounted to said lever arms and rotatably mounted around base ends of said propulsion blades.

19. The device of claim 1 wherein said radially spaced array of pitch control stub shafts are an uneven number of at least 3 equally spaced apart pitch control stub axles, each having corresponding pitch control gears within said pitch control housing, a pitch control drive shaft gear mounted to said pitch control drive shaft generally perpendicular to said pitch control gears, said pitch control drive shaft gear in mating engagement with said pitch control gears, rotation of said pitch control drive shaft thereby rotating said pitch control stub shafts.

20. The device of claim 5 wherein said second collar is rotatably retained within a radially centroidal aperture in said second supporting base by a second thrust collar mounted onto an end of said second collar protruding through said radially centroidal aperture.

21. The device of claim 20 wherein said second collar further comprises an annular plate rigidly mounted to said second collar so as to extend generally orthogonally radially outwardly of said second collar.

22. The device of claim 21 wherein said second thrust collar is mounted on said second collar on a side of said second supporting base opposite to said annular plate mounted to said second collar, wherein said annular plate mounted to said second collar is rotatably supported on said second supporting base.

23. The device of claim 22 wherein said second supporting base is an annular base plate corresponding in shape to said annular plate mounted to said second collar.

24. The device of claim 22 wherein said second thrust collar is selectively adjustably mounted onto said second collar for selectively adjusting compression of said second supporting base between said second thrust collar and said annular plate mounted to said second collar.

25. The device of claim 5 wherein said first collar is rotatably retained within a first radially centroidal aperture in said first supporting base by a first thrust collar mounted onto an end of said first collar protruding through said first radially centroidal aperture.

26. The device of claim 25 wherein said first thrust collar is mounted on said first collar on a side of said first supporting base opposite to said strut mount plate.

27. The device of claim 26 wherein said first supporting base is an annular plate corresponding in shape to said strut mount plate.

28. The device of claim 26 wherein said first thrust collar is selectively adjustably mounted onto said first collar for selectively adjusting compression of said first supporting base between said first thrust collar and said strut mount plate.

29. The device of claim 1 wherein said pitch control drive shaft has extending longitudinally therealong an oil infeed bore and, spaced apart from said oil infeed bore, an oil return bore, an oil infeed collar rotatably mounted onto said pitch control drive shaft and having a first radial collar aperture therethrough for fluid communication of lubricating oil from an oil supply line mounted to said oil infeed collar to a corresponding infeed radial shaft aperture radially bored from an outer surface of said pitch control drive shaft to intersect said oil infeed bore so that as said pitch control drive shaft is rotated about its longitudinal axis, a radially outermost-end of said radial infeed shaft aperture is rotated in a circular path so as to expose said radially outermost-end of said first radial shaft aperture within a sealed annular oil reservoir cavity between an inner annular surface of said oil infeed collar and said pitch control drive shaft, whereby oil fed under pressure from said oil supply line is fed into said oil reservoir cavity and thence to said oil infeed bore, said oil infeed bore having at least one outfeed radial shaft aperture spaced apart from said infeed radial shaft aperture and located along said oil infeed bore at positions requiring lubrication, and cooperating with said oil infeed bore for supplying oil to said positions requiring lubrication, said pitch control drive shaft having outfeed radial shaft apertures correspondingly located to said position requiring lubrication, along, so as to cooperate with, said oil return bore to thereby transfer oil from said positions requiring lubrication along said oil return bore, said pitch control drive shaft having an outfeed radial shaft aperture in fluid communication between said oil return bore and an oil return aperture in an oil return collar rotatably mounted on said pitch control drive shaft, an oil return line mounted to said oil collar for removing oil from said oil return collar.

30. The device of claim 29 wherein said positions requiring lubrication include said pitch control gear housing and positions corresponding to said first and second collars.

31. A propulsion blade deploying and pitch control apparatus for an airborne or water-borne craft comprising:

a hollow primary drive shaft having first and second ends, a pitch control gear housing mounted to said first end of primary drive shaft, a radially spaced array of pitch control stub shafts mounted to, in cooperation with, said pitch control gear housing so as to extend generally perpendicularly relative to said primary drive shaft, and so as to be selectively rotatable about corresponding pitch control shaft longitudinal axes upon selective actuation of gears cooperatively mounted in said pitch control gear housing, propulsion blades pivotally mounted to said pitch control stub shafts, at ends of said pitch control stub shafts radially distal from said pitch control gear housing, primary drive means mounted to said primary drive shaft for rotation of said primary drive shaft, said pitch control gear housing, said pitch control stub shafts and said propulsion blades about a primary drive shaft longitudinal axis, a selectively actuable strut mount plate rigidly mounted on a collar, said collar slidably mounted on said primary drive shaft, said strut mount plate rotatably mounted on a first supporting base, said strut mount plate, said collar and said first supporting base selectively translatable by means of first selective actuation means so as to slide along said primary drive shaft by means of said collar sliding on said primary drive shaft, said first selective actuation means rigidly mounted to said craft, said collar having a key-way, parallel and cooperating with said primary drive shaft for preventing relative rotational movement between said collar and said primary drive shaft about said primary drive shaft longitudinal axis, strut members having first and second ends, said strut members pivotally mounted at said first ends thereof to said propulsion blades, and pivotally mounted at said second ends thereof, to said strut mount plate, whereby selective translation of said strut mount plate and collar along said primary drive shaft selectively pivots said propulsion blades relative to said pitch control stub shafts so as to forcibly deploy and retract said propulsion blades, first and second coaxial nested pitch control drive shafts, each having corresponding first and second ends, rotatably co-axially journalled so as to be nested within, and co-axial to, said hollow primary drive shaft, said first and second pitch control drive shafts selectively rotatable relative to each other and to said primary drive shaft, said first ends of said first and second pitch control drive shafts engaging said gears in said pitch control gear housing, a second collar having a longitudinally spaced apart pair of inclined slots, longitudinally spaced apart relative to said longitudinal axis of said primary drive shaft, said pair of inclined slots counter-rotationally inclined relative to one another on an inner cylindrical surface of said second collar, said second collar slidably mounted on said second ends of said first and second pitch control drive shafts, a corresponding pair of rigid protrusions, corresponding to said longitudinally spaced apart pair of inclined slots, mounted, respectively to said second ends of said first and second pitch control drive shafts so as to protrude therefrom for sliding mating engagement with said pair of inclined slots, each inclined slot in said pair of inclined slots defining a corresponding inclined translation path inclined relative to said primary drive shaft longitudinal axis, wherein, said corresponding inclined translation paths are counter-rotationally oriented relative to each other about said first and second coaxial pitch control drive shafts such that, upon translation of said second collar along said longitudinal axis of said primary drive shaft, over said second ends of said first and second pitch control drive shafts, said first and second pitch control drive shafts counter-rotate relative to each other, second selective actuation means for selectively sliding said second collar axially along said second ends of said first and second pitch control drive shafts, whereby said selective sliding of said second collar forces rotation about said primary drive shaft longitudinal axis of said rigid protrusions so as to translate said rigid protrusions along said translation paths thereby rotating said pitch control drive shafts relative to said primary drive shaft, and selectively adjusting pitch of said propulsion blades while said propulsion blades are rotating about said primary drive shaft longitudinal axis, said second collar having a second keyway, parallel and cooperating with said pitch control drive shaft for preventing relative rotational movement between said second collar and said pitch control drive shaft about said primary drive shaft longitudinal axis, said second collar having a second key-way, parallel and cooperating with said pitch control drive shafts for preventing relative rotational movement between said second collar and said pitch control drive shafts about said primary drive shaft longitudinal axis, said second selective actuation means rigidly mounted to said craft.

32. The apparatus of claim 31 wherein each said inclined slot is helical and said protrusions are helical flanges corresponding to said pair of inclined slots.

33. The apparatus of claim 31 wherein said first selective actuation means includes a first screw spindle threadably mounted in a rigid support, said first screw spindle rotatably mounted to said first supporting base, whereby rotation of said first screw spindle selectively translates said first collar along said primary drive shaft longitudinal axis relative to said primary drive shaft.

34. The apparatus of claim 31 wherein said second collar is coupled to said primary drive shaft by a guide, wherein said guide is slidably mounted between said primary drive shaft and said second collar, so as to extend therebetween parallel to said primary drive shaft longitudinal axis, so as to allow sliding translation of said second collar along said second ends of said pitch control drive shafts relative to said primary drive shaft, said guide rotating said second collar synchronously with said primary drive shaft about said primary drive shaft longitudinal axis.

35. The apparatus of claim 34 wherein said second collar is rotatably mounted on a corresponding second supporting base lying in a plane perpendicular to said primary drive shaft longitudinal axis, and wherein said second supporting base is mounted to said second selective actuation means.

36. The apparatus of claim 35 wherein said second selective actuation means includes a second screw spindle threadably mounted in a rigid support, said second screw spindle rotatably mounted to said second supporting base, whereby selective rotation of said second screw spindle selectively translates said second collar along said primary drive shaft longitudinal axis relative to said primary drive shaft.

37. The apparatus of claim 31 wherein said radially spaced array of pitch control stub shafts are at least four equally spaced apart pitch control stub axles, each having a corresponding pitch control gear within said pitch control housing so as to form pairs of opposed facing pitch control gears, first and second pitch control drive shaft gears mounted, respectively, to said first and second pitch control drive shafts in opposed facing relation within said pitch control housing generally perpendicular to said opposed pairs of pitch control gears, said first pitch control drive shaft gear in mating engagement with said pairs of opposed facing pitch control gears at generally co-planar first points of contact, said second pitch control drive shaft gear in mating engagement with said pairs of opposed facing pitch control gears at generally co-planar second points of contact, said second points of contact opposite to said first points of contact relative to said pairs of opposed facing pitch control shaft gears, wherein counter rotation of said nested pitch control drive shafts relative to each other, counter rotates said pitch control gears in said opposed pairs of pitch control gears without clashing.

38. The apparatus of claim 31 wherein said radially spaced array of pitch control stub shafts are two pitch control stub axles, each having a corresponding pitch control gear within said pitch control housing so as to form a pair of opposed facing pitch control gears, a first pitch control drive shaft gear mounted to said first pitch control drive shaft generally perpendicular to said pair of pitch control gears, a second pitch control drive shaft gear mounted to said second pitch control drive shaft generally perpendicular to said pair of pitch control gears, said first and second pitch control drive shaft gears in mating engagement with said pair of pitch control shaft gears at first and second points of contact, wherein rotation of said nested first and second pitch control drive shafts counter-rotate said pitch control gears in said pair of pitch control gears.

39. The device of claim 31 wherein said strut mount plate extends generally orthogonally to, and so as to be axially symmetric about, said primary drive shaft longitudinal axis, and wherein said first and second collars are axially symmetric about said primary drive shaft longitudinal axis.

40. The device of claim 31 wherein said propulsion blades are rotor blades.

41. The device of claim 31 wherein said propulsion blades are propeller blades.

42. The device of claim 41 wherein said propeller blades are aircraft propeller blades.

43. The device of claim 41 wherein said propeller blades are water-craft propeller blades.

44. The device of claim 31 wherein said propulsion blades are water-craft jet drive impeller blades.

45. The device of claim 31 wherein said strut members are pivotally mounted to said propulsion blades by lever arms to extend generally orthogonally to a plane containing said pitch control stub shaft longitudinal axes.

46. The device of claim 45 wherein said strut members have first and second opposite ends, said first ends pivotally mounted to said propulsion blades, said second ends pivotally mounted to said strut mount plate.

47. The device of claim 46 wherein said lever arms are rotatably mounted on said propulsion blades so as to allow said propulsion blades to rotate about their longitudinal axes so as to change blade pitch.

48. The device of claim 47 wherein said lever arms are rotatably mounted on said propulsion blades at radially inner-ends of said propulsion blades by collars rigidly mounted to said lever arms and rotatably mounted around base ends of said propulsion blades.

49. The device of claim 31 wherein said radially spaced array of pitch control stub shafts are an uneven number of at least 3 equally spaced apart pitch control stub axles, each having corresponding pitch control gears within said pitch control housing, first and second pitch control drive shaft gear mounted to said first and second pitch control drive shaft 3 generally perpendicular to said pitch control gears, said first and second pitch control drive shaft gears in mating engagement with said pitch control gears, rotation of said first and second pitch control drive shafts thereby rotating said pitch control stub shafts.

50. The device of claim 35 wherein said second collar is rotatably retained within a radially centroidal aperture in said second supporting base by a second thrust collar mounted onto an end of said second collar protruding through said radially centroidal aperture.

51. The device of claim 50 wherein said second collar further comprises an annular plate rigidly mounted to said second collar so as to extend generally orthogonally radially outwardly of said second collar.

52. The device of claim 51 wherein said second thrust collar is mounted on said second collar on a side of said second supporting base opposite to said annular plate mounted to said second collar,
   wherein said annular plate mounted to said second collar is rotatably supported on said second supporting base.

53. The device of claim 52 wherein said second supporting base is an annular base plate corresponding in shape to said annular plate mounted to said second collar.

54. The device of claim 52 wherein said second thrust collar is selectively adjustably mounted onto said second collar for selectively adjusting compression of said second supporting base between said second thrust collar and said annular plate mounted to said second collar.

55. The device of claim 35 wherein said first collar is rotatably retained within a first radially centroidal aperture in said first supporting base by a first thrust collar mounted onto an end of said first collar protruding through said first radially centroidal aperture.

56. The device of claim 55 wherein said first thrust collar is mounted on said first collar on a side of said first supporting base opposite to said strut mount plate.

57. The device of claim 56 wherein said first supporting base is an annular plate corresponding in shape to said strut mount plate.

58. The device of claim 56 wherein said first thrust collar is selectively adjustably mounted onto said first collar for selectively adjusting compression of said first supporting base between said first thrust collar and said strut mount plate.

59. The device of claim 31 wherein each said first and second pitch control drive shafts has extending longitudinally therealong an oil infeed bore and, spaced apart from said oil infeed bore, an oil return bore,
   an oil infeed collar rotatably mounted onto each pitch control drive shaft of said first and second pitch control drive shafts, said oil infeed collar having a first radial collar aperture therethrough for fluid communication of lubricating oil from an oil supply line mounted to said oil infeed collar to a corresponding infeed radial shaft aperture radially bored from an outer surface of said each pitch control drive shaft to intersect said oil infeed bore so that as said each pitch control drive shaft is rotated about its longitudinal axis, a radially outermost-end of said radial infeed shaft aperture is rotated in a circular path so as to expose said radially outermost-end of said first radial shaft aperture within a sealed annular oil reservoir cavity between an inner annular surface of said oil infeed collar and said each pitch control drive shaft, whereby oil fed under pressure from said oil supply line is fed into said oil reservoir cavity and thence to said oil infeed bore, said oil infeed bore having at least one outfeed radial shaft aperture spaced apart from said infeed radial shaft aperture and located along said oil infeed bore at positions requiring lubrication, and cooperating with said oil infeed bore for supplying oil to said positions requiring lubrication, said each pitch control drive shaft having outfeed radial shaft apertures correspondingly located to said position requiring lubrication, along, so as to cooperate with, said oil return bore to thereby transfer oil from said positions requiring lubrication along said oil return bore, said each pitch control drive shaft having an outfeed radial shaft aperture in fluid communication between said oil return bore and an oil return aperture in an oil return collar rotatably mounted on said each pitch control drive shaft, an oil return line mounted to said oil collar for removing oil from said oil return collar.

60. The device of claim 59 wherein said positions requiring lubrication include said pitch control gear housing and positions corresponding to said first and second collars.

* * * * *